(12) United States Patent
Dei Santi et al.

(10) Patent No.: US 10,717,821 B2
(45) Date of Patent: Jul. 21, 2020

(54) MOISTURE CURABLE COMPOSITIONS

(71) Applicants: Dow Silicones Corporation, Midland, MI (US); Davide Dei Santi, Boussu (BE); Frederic Gubbels, Houtain-le-Val (BE)

(72) Inventors: Davide Dei Santi, Boussu (BE); Frederic Gubbels, Houtain-le-Val (BE)

(73) Assignee: Dow Silicones Corporation, Midland, MI (US)

( * ) Notice: Subject to any disclaimer, the term of this patent is extended or adjusted under 35 U.S.C. 154(b) by 57 days.

(21) Appl. No.: 16/085,758

(22) PCT Filed: Mar. 23, 2017

(86) PCT No.: PCT/EP2017/057019
§ 371 (c)(1),
(2) Date: Sep. 17, 2018

(87) PCT Pub. No.: WO2017/162839
PCT Pub. Date: Sep. 28, 2017

(65) Prior Publication Data
US 2019/0048146 A1 Feb. 14, 2019

(30) Foreign Application Priority Data
Mar. 23, 2016 (GB) .................................. 1604971.0

(51) Int. Cl.
| | | |
|---|---|---|
| *C08G 77/16* | (2006.01) | |
| *C08K 3/36* | (2006.01) | |
| *C08K 7/28* | (2006.01) | |
| *C08K 5/5465* | (2006.01) | |
| *C08K 5/5419* | (2006.01) | |
| *C08K 5/57* | (2006.01) | |
| *C08K 5/5415* | (2006.01) | |
| *C08K 5/5425* | (2006.01) | |
| *C08L 83/04* | (2006.01) | |
| *C08G 77/08* | (2006.01) | |
| *C08K 3/26* | (2006.01) | |
| *E06B 3/663* | (2006.01) | |

(52) U.S. Cl.
CPC ............ *C08G 77/16* (2013.01); *C08G 77/08* (2013.01); *C08K 3/26* (2013.01); *C08K 3/36* (2013.01); *C08K 5/5415* (2013.01); *C08K 5/5419* (2013.01); *C08K 5/5425* (2013.01); *C08K 5/5465* (2013.01); *C08K 5/57* (2013.01); *C08K 7/28* (2013.01); *C08L 83/04* (2013.01); *E06B 3/66328* (2013.01); *C08K 2003/265* (2013.01)

(58) Field of Classification Search
None
See application file for complete search history.

(56) References Cited

U.S. PATENT DOCUMENTS

| | | | | |
|---|---|---|---|---|
| 3,065,194 A | * | 11/1962 | Nitzsche | ............... C08G 77/16 524/788 |
| 3,624,022 A | * | 11/1971 | Ross | ............................. 523/219 |
| 4,100,129 A | * | 7/1978 | Beers | ................... C08K 5/0091 524/425 |
| 4,261,758 A | * | 4/1981 | Wright | .................... C08K 5/54 106/287.12 |
| 4,618,646 A | | 10/1986 | Takago et al. | |
| 5,648,427 A | | 7/1997 | Fujita et al. | |
| 5,744,703 A | * | 4/1998 | Krenceski | ............. G01N 19/04 73/54.01 |
| 5,969,057 A | * | 10/1999 | Schoeley | ............... C09J 183/04 525/474 |
| 5,990,231 A | * | 11/1999 | DeGroot, Jr. | ........ C08K 5/5419 524/730 |
| 6,172,150 B1 | * | 1/2001 | Kollmann | ............ C08K 5/0008 524/379 |
| 6,214,930 B1 | * | 4/2001 | Miyake | .................. C08G 77/04 524/425 |
| 6,238,755 B1 | * | 5/2001 | Harvey | ............... E06B 3/66328 156/109 |

(Continued)

FOREIGN PATENT DOCUMENTS

| | | |
|---|---|---|
| CN | 103820072 A | 5/2014 |
| JP | H051225 A | 1/1993 |

(Continued)

OTHER PUBLICATIONS

Machine translation of JP-H11189721, translation generated Dec. 2019, 27 pages. (Year: 2019).*
English language abstract and machine translation for CN103820072 (A) extracted from espacenet.com on Aug. 27, 2018, 18 pages.
PCT International Search Report for PCT/EP2017/057019 dated May 30, 2017, 4 pages.
Machine assisted English translation of JP2000017175A obtained from https://patents.google.com/patent on Apr. 3, 2020, 11 pages.

(Continued)

*Primary Examiner* — Robert S Loewe
(74) *Attorney, Agent, or Firm* — Warner Norcross + Judd LLP

(57) ABSTRACT

A two part moisture curing composition, exhibiting low thermal conductivity, has a part A) and a part B). Part A) comprises either: 1) a siloxane polymer (I) having at least two terminal hydroxyl or hydrolysable groups and a viscosity of from 20,000 to 40,000 mPa·s at 25° C.; or 2) a polymer mixture (II) of polymer (i) a siloxane polymer having at least two terminal hydroxyl or hydrolysable groups and a viscosity≥25,000 mPa·s at 25° C., and polymer (ii) a siloxane polymer having at least two terminal hydroxyl or hydrolysable groups and a viscosity of between 1,000 and 20,000 mPa·s at 25° C. Part A) further comprises a reinforcing filler and a low-density filler, the total filler content being between 30 and 45% in volume of the total composition. Part B) comprises a moisture curing agent formulation comprising a tin based catalyst and one or more crosslinkers.

19 Claims, No Drawings

(56) References Cited

U.S. PATENT DOCUMENTS

| | | | | |
|---|---|---|---|---|
| 6,313,220 B1* | 11/2001 | Materne | ............... | B60C 1/00 524/863 |
| 7,527,838 B2* | 5/2009 | Correia | ............... | C03C 27/10 428/34 |
| 9,249,301 B2* | 2/2016 | Schoeley | ............... | C08L 83/04 |
| 2003/0176560 A1* | 9/2003 | Mueller | ............... | C08K 7/00 524/494 |
| 2005/0192387 A1* | 9/2005 | Williams | ............... | C08K 5/57 524/261 |
| 2007/0021563 A1* | 1/2007 | Kasai | ............... | C08G 65/48 525/191 |
| 2007/0088123 A1* | 4/2007 | Futatsumori | ............ | C08L 83/04 524/863 |
| 2007/0116907 A1* | 5/2007 | Landon | ............... | C03C 27/10 428/34 |
| 2007/0244249 A1* | 10/2007 | Correia | ............ | C09K 3/1018 524/588 |
| 2010/0098888 A1 | 4/2010 | Landon et al. | | |
| 2011/0178220 A1* | 7/2011 | Davio | ............... | C08L 83/04 524/425 |
| 2012/0022209 A1* | 1/2012 | Djurdjevic | ............ | C08L 83/04 524/588 |
| 2013/0245172 A1* | 9/2013 | Buttner | ............... | C08L 83/04 524/243 |
| 2014/0096307 A1* | 4/2014 | Holzner | ............... | C08J 7/065 2/167 |
| 2015/0210909 A1* | 7/2015 | Von Malotki | ............ | C08K 3/04 428/447 |
| 2016/0340548 A1* | 11/2016 | Gubbels | ............... | C09D 183/06 |

FOREIGN PATENT DOCUMENTS

| | | | |
|---|---|---|---|
| JP | 11189721 | * 7/1999 | ............. C08L 83/04 |
| JP | 2000017175 A | 1/2000 | |
| JP | 2014070079 A | 4/2014 | |
| KR | 1020080077631 A | 8/2008 | |
| WO | 2007061642 A2 | 5/2007 | |
| WO | 2012033886 A1 | 3/2012 | |
| WO | 2012119940 A1 | 9/2012 | |
| WO | 2015098119 A1 | 7/2015 | |

OTHER PUBLICATIONS

Machine assisted English translation of JP2014070079A obtained from https://patents.google.com/patent on Apr. 3, 2020, 12 pages.

* cited by examiner

MOISTURE CURABLE COMPOSITIONS

CROSS-REFERENCE TO RELATED APPLICATIONS

This application is the National Stage of International Application No. PCT/EP2017/057019 filed on 23 Mar. 2017, which claims priority to and all advantages of Great Britain Patent Application No. 1604971.0 filed on 23 Mar. 2016, the content of which is hereby incorporated by reference.

This concerns the development of a moisture cure organosiloxane composition that may be used as a sealant in "high performance" insulation systems in building facades or the like and which exhibits low thermal conductivity.

Condensation curable organosiloxane compositions, which cure to elastomeric solids, are well known. Typically, such compositions are obtained by mixing a polydiorganosiloxane having reactive terminal groups, e.g. hydroxy groups or hydrolysable groups, with e.g. a silane cross-linking agent which is reactive with the polydiorganosiloxane, for example an acetoxy silane, an oximosilane, an aminosilane or an alkoxysilane in the presence of a suitable catalyst. The resulting compositions are curable upon exposure to atmospheric moisture at room temperature and may be used as structural sealants/adhesives in "high performance" insulation systems in building facades or the like.

One important application of the above-described curable compositions is their use as adhesives and/or sealants. In use as sealants, it is important that a composition is capable of curing in comparatively thick layers to provide an elastomeric body having a thickness greater than about 2 mm. It is frequently desirable that the organopolysiloxane composition cures quickly enough to provide a sound seal within several hours but not so quickly that the surface cannot be tooled to a desired configuration shortly after application.

It has been a practice for many years to form insulating glass units (IGUs) consisting of two three or even more glass panes which are spaced apart by a spacing and sealing assembly (often referred to as an "edge seal") extending around the periphery of the inner facing surfaces of the glass panes to define a substantially hermetically sealed insulating space between the glass panes. It is now common practice to employ a metal or non-metal (e.g. butyl, silicone foam, organic rubber foam or thermoplastic) preformed spacer to hold the glass panes separated and to assure the required rigidity of the unit. The preformed spacer may also contain a desiccant in such a way as to enable the desiccant to maintain air or more often other gases within the unit in a dry condition after the manufacture of the unit. Generally the form of the IGU construction has an edge seal comprising an optionally hollow preformed spacer element adhered to the inner facing surfaces of the glass panes by a low gas and moisture permeable sealant to provide a primary hermetic seal. The primary hermetic seal is often provided by use of a butyl sealant, i.e. a polyisobutylene rubber based composition as primary sealant to bond the spacer to the glass panes and to employ a secondary sealant, such as silicone sealants described above, bonded to the panes around the spacer. This system, often referred to as a dual seal system provides better longevity of the IGU than single seal systems in which only a single sealant is employed. Silicone sealant materials are one of several alternative secondary sealants materials. It is now increasingly becoming standard to use a gas other than air for example an inert gas such as Argon, Xenon, Krypton or $SF_6$ to reduce the thermal conductivity of the system required.

In an IGU as described the primary sealant ensures satisfactory adhesion of the spacer to the glass panes so as to provide desired moisture vapour or gas vapour impermeability to the unit thus avoiding moisture vapour entering and condensing in the cavity of the unit and in case of a gas filled unit to prevent the escape of the inert gas from the unit. The secondary sealant serves to promote the integrity of the bond of the butyl rubber based composition by minimising strain imposed on it due to external factors such as fluctuations in ambient temperature barometric pressure and or wind pressure.

Industrially one of the most important aspects of an IGU is the U-value or thermal transmittance through the IGU, i.e. the rate of transfer of heat (in Watts) through one square metre of a structure divided by the difference in temperature across the structure ($W/m^2K$). High performance insulation systems used in building façade applications (e.g. insulating construction panels and gas filled IGUs) have been developed to reduce carbon footprint of buildings. Nowadays, triple glass IGUs mounted with warm edge spacer bars are used commonly in facades. The contribution of the insulating glass (IG) secondary sealant to the thermal flow through the IG unit is becoming significant, especially in these optimized systems. Thermal transfer by conduction or convection is for example decreased by substituting the air present in the cavity of the IGU with a heavy rare gas having a lower thermal conductivity. Transfer by radiation is for example decreased using low-emissivity (low E) glass. The use of a metal spacer results in high thermal conductivity at the perimeter of the IGU and as such said metal spacers have become increasingly undesirable in recent years. Several technical solutions have been proposed to reduce thermal conductivity of edge seals, not least leading to the replacement of metal spacers with non-metal spacers such as thermoplastic spacers. The use of such materials to minimise thermal conductivity through the system has led to the secondary sealant in the system having an increasingly important responsibility for the level of thermal conductivity in the edge seal of an IGU as spacers approach their technical limit for low heat transfer resulting in the heat transfer of the secondary sealant being potentially higher than that of the spacers. The thermal conductivity of a typical secondary sealant currently is in the region of between 0.35 to 0.40 W/mK (measured in accordance with ISO 8301:1991).

Hence, the use of low thermally conductive secondary sealants for the production of insulating glass units and facade systems will significantly help reduce the heat flow through such systems.

That said, whilst there is a need to reduce thermal conductivity in secondary sealants in IGUs, it is imperative that such benefits are not detrimental to other physical properties of the sealant. For example, high performance glazing units in applications such as structural glazing or certain types of roof glazing require the entire or part of the seal system of the unit to be directly exposed to sunlight (e.g. potentially damaging UV radiation). In such applications the sealant is not only required to contribute to the integrity of the seal system of the unit against e.g. barometric pressure variation inside the cavity but also to contribute to the transfer of wind load or dead load on the structure of the building. Furthermore glass adhesion of the sealant in such applications has to have excellent resistance against the damaging influences of sunlight (UV radiation) and other weathering elements (heat and water ingress).

The introduction of hollow mineral and/or organic microspheres to reduce thermal conductivity of such sealants is known. However, whilst these have been shown to reduce thermal conductivity of the sealant their introduction results in a significant increase in viscosity of the sealant composition prior to curing and this provides the user with a major problem as to how to apply the sealant onto/into the IGU. Typically sealant guns or other suitable dispensing equipment are used but given increased viscosity caused by the introduction of hollow mineral microspheres and/or organic microspheres the speed and efficiency of application of such sealants can be quickly reduced.

Hence, whilst the need to minimise the thermal conductivity of the edge seal of which the thermal conductivity of the secondary sealant is becoming increasingly significant, it is also equally important to retain other physical properties of the secondary sealant to avoid other potentially detrimental effects in reduction of said other physical properties whilst reducing the thermal conductivity of the secondary sealant.

Hence, there is provided herein a silicone sealant composition which provides a reduction in thermal conductivity whilst retaining other physical properties and the ability to be applied into/onto substrates.

There is provided herein a two part moisture curing composition having a Part A and a Part B in which,
Part A comprises either:
1) A siloxane polymer (I) having at least two terminal hydroxyl or hydrolysable groups having a viscosity of from 20000 to 40000 mPa·s at 25° C.; or
2) A mixture of polymer (i) and polymer (ii) wherein:
Polymer (i) is a siloxane polymer having at least two terminal hydroxyl or hydrolysable groups and a viscosity≥25,000 mPa·s at 25° C. and
Polymer (ii), a siloxane polymer having at least two terminal hydroxyl or hydrolysable groups and a viscosity of between 1,000 and 20,000 mPa·s at 25° C., and in addition to 1) or 2) above:
A reinforcing filler,
A low density filler,
wherein the total filler content is between 30 and 45% in volume of the total formulation; and
Part B comprises a moisture curing agent formulation comprising:
1) A suitable amount of a tin based catalyst and
2) One or more crosslinkers having 3 or more hydroxyl and/or hydrolysable groups for curing Part A;
which Part A and/or the composition of Part A+Part B after mixing has a thermal conductivity≤0.20 W/mK.

Alternatively, there is provided herein a two part moisture curing composition having a Part A and a Part B in which, Part A comprises:
Polymer (i), a siloxane polymer having terminal hydroxyl or hydrolysable groups and a viscosity≥25,000 mPa·s at 25° C. and
Polymer (ii), a siloxane polymer having terminal hydroxyl or hydrolysable groups and a viscosity 1,000 and 20,000 mPa·s at 25° C.,
A reinforcing filler,
A low density filler,
wherein the total filler content is between 30 and 45% in volume of the total formulation; and
Part B comprises a moisture curing agent formulation based on tin catalyst and hydrolysable crosslinkers for curing Part A; which composition has a thermal conductivity 0.20 W/mK.

Unless otherwise indicated all viscosity measurements were determined by using a Brookfield® cone plate viscometer (RV DIII) using cone plate CP-52 for viscosities of 40,000 mPa·s and below and cone plate CP-51 for materials having viscosities greater than 40,000 mPa·s adapting the speed according to the polymer viscosity and all viscosity measurements were taken at 25° C. unless otherwise indicated. All thermal conductivity measurements herein are in measured in accordance with ISO 8301:1991 unless otherwise indicated. The total filler content by volume is determined by calculation based on the density of each ingredient (which was either provided by the supplier or determined in the laboratory) and then values of volume were extrapolated from the results, given the weight was known.

Polymers (I), (i) and (ii) are siloxane polymers having terminal hydroxyl or hydrolysable groups. In each case polymers (I), (i) and (ii) may, for example, have the general formula:

$$X^1-Z-X^2 \quad (1)$$

where $X^1$ and $X^2$ are independently selected from silicon containing groups which contain hydroxyl or hydrolysable substituents and Z represents a polymer chain. Examples of $X^1$ or $X^2$ groups incorporating hydroxyl and/or hydrolysable substituents include groups terminating as described below:

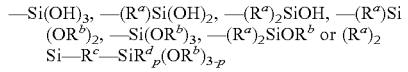

where each $R^a$ independently represents a monovalent hydrocarbyl group, for example, an alkyl group, in particular having from 1 to 8 carbon atoms, (and is preferably methyl); each $R^b$ and $R^d$ group is independently an alkyl or alkoxy group in which the alkyl groups suitably have up to 6 carbon atoms; $R^c$ is a divalent hydrocarbon group which contains between 1 and 10 carbon atoms which may be interrupted by one or more siloxane spacers having up to six silicon atoms; and p has the value 0, 1 or 2. It is preferred that the terminal hydroxyl or hydrolysable groups are hydroxyl groups.

The polymer chain Z can for example be a siloxane-containing polymer chain such as an organopolysiloxane or a siloxane/organic block copolymeric molecular chain. Hydroxy-terminated organopolysiloxanes, particularly polydiorganosiloxanes, are widely used in sealants and are suitable for use herein as polymer (I) or polymers (i) and/or (ii). Thus the polymer (I) or Polymers (i) and/or (ii) preferably include siloxane units of formula (2):

$$-(R^5_s SiO_{(4-s)/2})- \quad (2)$$

in which each $R^5$ is independently an organic group such as a hydrocarbon group having from 1 to 18 carbon atoms, a substituted hydrocarbon group having from 1 to 18 carbon atoms or a hydrocarbonoxy group having up to 18 carbon atoms and s has, on average, a value of from 1 to 3, preferably 1.8 to 2.2. In a substituted hydrocarbon group, one or more hydrogen atoms in the group have been replaced with another substituent. Examples of such substituents include, but are not limited to, halogen atoms such as chlorine, fluorine, bromine, and iodine; halogen atom containing groups such as chloromethyl, perfluorobutyl, trifluoroethyl, and nonafluorohexyl; oxygen atoms; oxygen atom containing groups such as (meth)acrylic and carboxyl; nitrogen atoms; nitrogen atom containing groups such as amino-functional groups, amido-functional groups, and cyano-functional groups; sulphur atoms; and sulphur atom containing groups such as mercapto groups.

Preferably each $R^5$ is a hydrocarbyl group having from 1 to 10 carbon atoms optionally substituted with one or more halogen group such as chlorine or fluorine and s is 0, 1 or 2. Particular examples of groups $R^5$ include methyl, ethyl, propyl, butyl, vinyl, cyclohexyl, phenyl, tolyl group, a propyl group substituted with chlorine or fluorine such as 3,3,3-trifluoropropyl, chlorophenyl, beta-(perfluorobutyl) ethyl or chlorocyclohexyl group. Suitably, at least some and preferably substantially all of the groups $R^5$ are methyl.

Polydiorganosiloxanes comprising units of the formula (2) may be homopolymers or copolymers in either block form or in a random continuation. Mixtures of different polydiorganosiloxanes are also suitable. In the case of polydiorganosiloxane co-polymers the polymeric chain may comprise a combination of blocks made from chains of units depicted in FIG. (2) above with s=2, where the two $R^5$ groups are:
  both alkyl groups (preferably both methyl or ethyl), or
  alkyl and phenyl groups, or
  alkyl and fluoropropyl, or
  alkyl and vinyl or
  alkyl and hydrogen groups.
Typically at least one block will comprise siloxane units in which both $R^5$ groups are alkyl groups.

Polymer (I) or Polymers (i) and/or (ii) may alternatively have a block copolymeric backbone comprising at least one block of siloxane groups of the type depicted in formula (2) above and at least one block comprising any suitable organic polymer chain. The organic polymer backbone may comprise, for example, polyoxyalkylene, polystyrene and/or substituted polystyrenes such as poly(α-methylstyrene), poly(vinylmethylstyrene), dienes, poly(p-trimethylsilylstyrene) and poly(p-trimethylsilyl-α-methylstyrene). Other organic components which may be incorporated in the polymeric backbone may include acetylene terminated oligophenylenes, vinylbenzyl terminated aromatic polysulphones oligomers, aromatic polyesters, aromatic polyester based monomers, polyalkylenes, polyurethanes, aliphatic polyesters, aliphatic polyamides and aromatic polyamides.

The most preferred organic polymer blocks in a siloxane organic block copolymer (A) are polyoxyalkylene based blocks comprising recurring oxyalkylene units, illustrated by the average formula $(-C_nH_{2n}-O-)_y$ wherein n is an integer from 2 to 4 inclusive and y is an integer of at least four. The number average molecular weight of each polyoxyalkylene polymer block may range from about 300 to about 10,000. Moreover, the oxyalkylene units are not necessarily identical throughout the polyoxyalkylene block, but can differ from unit to unit. A polyoxyalkylene block, for example, can comprise oxyethylene units $(-C_2H_4-O-)$, oxypropylene units $(-C_3H_6-O-)$ or oxybutylene units $(-C_4H_8-O-)$, or mixtures thereof. Preferably the polyoxyalkylene polymeric backbone consists essentially of oxyethylene units or oxypropylene units. Other polyoxyalkylene blocks may include for example: units of the structure:

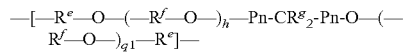

in which Pn is a 1,4-phenylene group, each $R^e$ is the same or different and is a divalent hydrocarbon group having 2 to 8 carbon atoms, each $R^f$ is the same or different and is an ethylene group or propylene group, each $R^g$ is the same or different and is a hydrogen atom or methyl group and each of the subscripts h and q1 is a positive integer in the range from 3 to 30.

Polymer (I) or polymers (i) and/or (ii) can alternatively be an organic polymer containing reactive hydroxyl or hydrolysable groups bonded to silicon. By an organic polymer we mean a material based on carbon chemistry, which is a polymer in which at least half the atoms in the polymer backbone are carbon atoms. The organic polymer is preferably a telechelic polymer having terminal moisture curable silyl groups containing reactive hydroxyl or hydrolysable groups bonded to silicon. The organic polymer can for example be selected from polyethers, hydrocarbon polymers, acrylate polymers, polyurethanes and polyureas.

One preferred type of polyether is a polyoxyalkylene polymer comprising recurring oxyalkylene units of the formula $(-C_nH_{2n}-O-)$ wherein n is an integer from 2 to 4 inclusive, as described above in connection with siloxane polyoxyalkylene block copolymers. Polyoxyalkylenes usually have terminal hydroxyl groups and can readily be terminated with moisture curable silyl groups, for example by reaction with an excess of an alkyltrialkoxysilane to introduce terminal alkyldialkoxysilyl groups. Alternatively polymerization may occur via a hydrosilylation type process. Polyoxyalkylenes consisting wholly or mainly of oxypropylene units have properties suitable for many sealant uses.

Examples of silyl modified hydrocarbon polymers include silyl modified polyisobutylene, which is available commercially in the form of telechelic polymers. Silyl modified polyisobutylene can for example contain curable silyl groups derived from a silyl-substituted alkyl acrylate or methacrylate monomer such as a dialkoxyalkylsilylpropyl methacrylate or trialkoxysilylpropyl methacrylate, which can be reacted with a polyisobutylene prepared by living anionic polymerization, atom transfer radical polymerization or chain transfer polymerization.

The organic polymer having hydrolysable silyl groups can alternatively be an acrylate polymer, that is an addition polymer of acrylate and/or methacrylate ester monomers, which preferably comprise at least 50% by weight of the monomer units in the acrylate polymer. Examples of acrylate ester monomers are n-butyl, isobutyl, n-propyl, ethyl, methyl, n-hexyl, n-octyl and 2-ethylhexyl acrylates. Examples of methacrylate ester monomers are n-butyl, isobutyl, methyl, n-hexyl, n-octyl, 2-ethylhexyl and lauryl methacrylates. For sealant use, the acrylate polymer preferably has a glass transition temperature (Tg) below ambient temperature; acrylate polymers are generally preferred over methacrylates since they form lower Tg polymers. Polybutyl acrylate is particularly preferred. The acrylate polymer can contain lesser amounts of other monomers such as styrene, acrylonitrile or acrylamide. The acrylate(s) can be polymerized by various methods such as conventional radical polymerization, or living radical polymerization such as atom transfer radical polymerization, reversible addition—fragmentation chain transfer polymerization, or anionic polymerization including living anionic polymerization. The curable silyl groups can for example be derived from a silyl-substituted alkyl acrylate or methacrylate monomer. Hydrolysable silyl groups such as dialkoxyalkylsilyl or trialkoxysilyl groups can for example be derived from a dialkoxyalkylsilylpropyl methacrylate or trialkoxysilylpropyl methacrylate. When the acrylate polymer has been prepared by a polymerization process which forms reactive terminal groups, such as atom transfer radical polymerization, chain transfer polymerization, or living anionic polymerization, it can readily be reacted with the silyl-substituted alkyl acrylate or methacrylate monomer to form terminal hydrolysable silyl groups.

Silyl modified polyurethanes or polyureas can for example be prepared by the reaction of polyurethanes or polyureas having terminal ethylenically unsaturated groups with a silyl monomer containing hydrolysable groups and a Si—H group, for example a dialkoxyalkylsilicon hydride or trialkoxysilicon hydride.

Polymer (I) may comprise a siloxane polymer having terminal hydroxyl or hydrolysable groups having a viscosity of from 20000 to 400000 mPa·s at 25° C., alternatively having a viscosity in the range of 25,000 to 35,000 mPa·s at 25° C. It is preferred that the terminal hydroxyl or hydrolysable groups are hydroxyl groups. When present, polymer (I) is present in the composition in an amount of from 10 to 70% weight alternatively 20 to 50% weight based on the total weight of Part A.

Polymer (i) may comprise a siloxane polymer having terminal hydroxyl or hydrolysable groups having a viscosity≥25,000 mPa·s at 25° C., alternatively having a viscosity in the range of 30,000 to 1,000,000 mPa·s at 25° C. It is preferred that the terminal hydroxyl or hydrolysable groups are hydroxyl groups. Polymer (i) is present in the composition in an amount of from 10 to 70% weight alternatively 20 to 50% weight based on the total weight of Part A.

Polymer (ii) may comprise a siloxane polymer having terminal hydroxyl or hydrolysable groups having a viscosity of between 1000 to 20,000 mPa·s at 25° C., alternatively having a viscosity in the range of 2000 to 15,000 mPa·s at 25° C. It is preferred that the terminal hydroxyl or hydrolysable groups are hydroxyl groups. Polymer (ii) is present in the composition in an amount of from 10 to 70% weight based on the total weight of Part A.

Optionally a third polymer, a further siloxane polymer having terminal hydroxyl or hydrolysable groups and a viscosity of between 10 and 500 mPa·s at 25° C., hereafter referred to as Polymer (iii) is provided. It is preferred that the terminal hydroxyl or hydrolysable groups are hydroxyl groups. Polymer (iii) may alternatively have a viscosity of between 10 and 200 mPa·s at 25° C. and as a further alternative a viscosity of between 10 and 100 mPa·s at 25° C. When present polymer (iii) is introduced into Part A of the composition. This may have the same structure as polymers (I), (i) and (ii) but again has a distinct viscosity range therefrom. When present optional Polymer (iii) is present in an amount of from 0.5 to 10%, alternatively 1 to 5% weight based on the total weight of Part A.

In one embodiment the viscosity of the mixture of Polymer (i) and Polymer (ii) when mixed together is between 20,000 mPa·s and 40,000 mPa·s at 25° C.

Reinforcing Fillers

Any suitable reinforcing filler may be incorporated into Part A. This will improve the mechanical properties of the composition. Examples of suitable reinforcing filler include but are not restricted to high surface area fumed and precipitated silicas and/or precipitated or ground calcium carbonate. The content of the reinforcing filler may be between 20 and 35% in weight of the total formulation (i.e. weight in Part A+Part B–calculated based on the total weight of said Part A+Part B).

In addition, a surface treatment of the reinforcing filler(s) may be performed, for example with a fatty acid or a fatty acid ester such as a stearate, or with organosilanes, organosiloxanes, or organosilazanes hexaalkyl disilazane or short chain siloxane diols to render the filler(s) hydrophobic and therefore easier to handle and obtain a homogeneous mixture with the their sealant components The surface treatment of the fillers makes the fillers e.g. ground calcium carbonate and/or precipitated calcium carbonate easily wetted by the silicone polymer. These surface modified fillers do not clump, and can be homogeneously incorporated into the silicone polymer. This results in improved room temperature mechanical properties of the uncured compositions. Furthermore, the surface treated fillers give a lower conductivity than untreated or raw material. The filler(s) may for example be precipitated silica, ground calcium carbonate and/or precipitated calcium carbonate each of which has independently been treated by a treating agent discussed above, typically stearic acid or a stearate.

Low Density (i.e.<1 g/Cm$^3$) Non-Porous Mineral Hollow Microspheres and or Organic Hollow Microspheres.

As previously indicated the thermal conductivity of a sealant or the like may be reduced by partially replacing the reinforcing fillers above with mineral hollow microspheres and/or organic hollow microspheres in the composition. The hollow cavity in each microsphere may be filled with suitable gases e.g. for the sake of example, $CO_2$ and argon to further reduce thermal conductivity. Mineral hollow microspheres are generally glass or ceramic based. Organic hollow microspheres may be based on organic polymers (polyethylene (PE), polyurethane (PU), polysulphide (PS), and polymethyl methacrylate (PMMA)). Any suitable microspheres as described above may be utilised but mineral hollow microspheres are preferred. Commercially available examples include Potters Sphericels or Q-Cels, 3M® Glass Bubbles or Akzo Nobel Expancel®.

The minimum size of mineral hollow microspheres available on the market is 5 μm while maximum size is up to 500 μm. The minimum size of the organic hollow microspheres available on the market is 10 μm, and maximum size up to 1000 μm. Given the application of interest herein the microspheres at the lower end of the range are not preferred because they have a much greater thermal conductivity than the larger microspheres in the range above. The larger the hollow microspheres, the lower the thermal conductivity of the sealant etc. into which they are introduced. This is because the hollow microspheres have significantly lower thermal conductivity, e.g. <0.062 W/mK than conventional sealants etc. which are generally perceived to be ≥0.35 W/mK.

That said use of the largest of the microspheres e.g. glass beads in sealant compositions is itself limited because of technical limitations in processing equipment and inferior physical properties of the resulting sealants etc. This is because as the size of the microspheres e.g. glass beads increases they also become increasingly more brittle resulting in an increase in the thermal conductivity of the adhesive/sealant. Given the above, microspheres having a true density (particle density) comprised between 0.15 to 0.5 g/cm$^3$, alternatively between 0.2 and 0.4 g/cm$^3$ are used as they are perceived to provide the best all round performance, providing good thermal performances and a product that can be used through a dispensing equipment without significant breakage of the microspheres. The values for true density given throughout are those supplied by the relevant manufacturer.

The low density filler may comprise between 3 and 35% in weight of the total formulation (i.e. of Part A+Part B). Whilst as discussed above, the thermal conductivity of sealants etc. as described herein is reduced with the use of low thermal conductivity filler such as hollow glass beads, the addition of solid particles (i.e. reinforcing filler and/or hollow glass beads) above a level of about 45% in volume determined on the basis of the densities of the ingredients in the sealant composition and the weight of the content of the composition is compromising some key physical properties of the material. As the solid (filler) level increases the extrudability and dispensing ability of the non-cured paste decreases rapidly as the level of solid increases. This will significantly decrease the productivity of assembling or sealing units. In addition, elongation, tensile strength and adhesion to the substrate of the cured material are impaired as the solid content in the sealant or adhesive is increased. Hence, it is preferred to have a maximum total filler (reinforcing filler+microspheres) content by volume of 45% of the composition.

Crosslinkers

The crosslinker which is present in Part B of the two part composition contains at least three groups reactive with the silicon-bonded hydroxyl or hydrolysable groups of Polymers (I), (i), (ii) and optionally (iii). The reactive groups of crosslinker are themselves preferably silanol groups or silicon bonded hydrolysable groups, most preferably hydrolysable groups. The crosslinker can for example be a silane or an organopolysiloxane, for example a polydiorganosiloxane having from 2 to about 1000 siloxane units. The molecular structure of such an organopolysiloxane can be straight chained, branched, or cyclic. The crosslinker can alternatively be an organic polymer substituted by 3 or more silicon-bonded hydrolysable groups. For the avoidance of doubt Polymer (iii) and the short chain organopolysiloxane based crosslinkers are not one and the same. Polymer (iii) will typically only have two hydroxyl or hydrolysable groups whereas the crosslinker must have at least 3 hydroxyl or hydrolysable groups to ensure the ability to crosslink and indeed generally the reactive groups of the crosslinker are preferably silicon bonded hydrolysable groups as described below.

The hydrolysable groups in the crosslinker can for example be selected from acyloxy groups (for example, acetoxy, octanoyloxy, and benzoyloxy groups); ketoximino groups (for example dimethyl ketoximo, and isobutylketoximino); alkoxy groups (for example methoxy, ethoxy, and propoxy) and/or alkenyloxy groups (for example isopropenyloxy and 1-ethyl-2-methylvinyloxy).

Typically the crosslinker is a silane having three silicon-bonded hydrolysable groups per molecule. In such cases, the fourth group is suitably a non-hydrolysable silicon-bonded organic group. These silicon-bonded organic groups are suitably hydrocarbyl groups which are optionally substituted by halogen such as fluorine and chlorine. Examples of such fourth groups include alkyl groups (for example methyl, ethyl, propyl, and butyl); cycloalkyl groups (for example cyclopentyl and cyclohexyl); alkenyl groups (for example vinyl and allyl); aryl groups (for example phenyl, and tolyl); aralkyl groups (for example 2-phenylethyl) and groups obtained by replacing all or part of the hydrogen in the preceding organic groups with halogen. Preferably the fourth silicon-bonded organic group is methyl or ethyl.

Examples of crosslinkers include acyloxysilanes, particularly acetoxysilanes such as methyltriacetoxysilane, vinyltriacetoxysilane, ethyl triacetoxysilane, di-butoxy diacetoxysilane and/or dimethyltetraacetoxydisiloxane, and also phenyl-tripropionoxysilane. The crosslinker can be an oxime-functional silane such as methyltris(methylethylketoximo)silane, vinyl-tris(methylethylketoximo)silane, or an alkoxytrioximosilane. The crosslinker can be an alkoxysilane, for example an alkyltrialkoxysilane such as methyltrimethoxysilane, methyltriethoxysilane, isobutyltrimethoxysilane or ethyltrimethoxysilane, an alkenyltrialkoxysilane such as vinyltrimethoxysilane or vinyltriethoxysilane, or phenyltrimethoxysilane, 3,3,3-trifluoropropyltrimethoxysilane, or ethylpolysilicate, n-propylorthosilicate, ethylorthosilicate, or an alkenyloxysilane such as methyltris(isopropenoxy)silane or vinyltris(isopropenoxy)silane. The crosslinker can alternatively be polydiorganosiloxane, for example polydimethylsiloxane, with trimethoxysilyl terminal groups or can be an organic polymer, for example a polyether such as a polypropylene oxide with terminal groups having methoxysilane functionality such as trimethoxysilyl groups as described in US2009/0281222, i.e. hexamethoxy disilyl alkylenes and derivatives. The crosslinker used may also comprise any combination of two or more of the above.

The amount of crosslinker present in the composition will depend upon the particular nature of the crosslinker, particularly its molecular weight. The compositions suitably contain crosslinker in at least a stoichiometric amount as compared to the polymer in Part (A). Compositions may contain, for example, from 1-30% by weight of crosslinker, generally from 1 to 10% (based on total composition (weight of Part A+Part B). For example, crosslinkers containing acetoxy groups or oximino groups may typically be present in amounts of from 3 to 8% by weight of the composition.

Catalysts

Condensation catalysts which may be used as the catalyst for the polymerisation reaction in the present invention include condensation catalysts incorporating tin, for example organic tin metal catalysts such as triethyltin tartrate, tin octoate, tin oleate, tin naphthate, butyltintri-2-ethylhexoate, tinbutyrate, carbomethoxyphenyl tin trisuberate, isobutyltintriceroate, and diorganotin salts especially diorganotin dicarboxylate compounds such as dibutyltin dilaurate, dimethyltin dibutyrate, dibutyltin dimethoxide, dibutyltin diacetate, dimethyltin bisneodecanoate Dibutyltin dibenzoate, stannous octoate, dimethyltin dineodeconoate, dibutyltin dioctoate of which dibutyltin dilaurate, dibutyltin diacetate are particularly preferred. Typically the catalyst is present in an amount of from 0.005 to 0.5%, alternatively 0.01 to 0.1% by weight of the total composition (i.e. Part A+Part B)

Additives

The composition of the invention can include other ingredients known for use in moisture curable compositions based on silicon-bonded hydroxyl or hydrolysable groups such as sealant compositions.

Plasticisers and Extenders

The two part composition may comprise a silicone or organic fluid which is neither reactive with Polymers (I), (i), (ii) and/or polymer (iii) when present nor with the crosslinker(s). Such a silicone or organic fluid acts as a plasticizer or extender (sometimes referred to as a processing aid) in the composition. The silicone or organic fluid can be present in up to 200 parts by weight of the moisture curable composition per 100 parts of polymers (I)+(iii) cumulatively or polymers (i)+(ii)+(iii) cumulatively, for example from 5 or 10 parts by weight up to 150 parts by weight based on 100 parts by weight of polymers (I)+(iii) cumulatively or polymers (i)+(ii)+(iii) cumulatively.

Examples of non-reactive silicone fluids useful as plasticizers and which may be included in the two part composition, include polydiorganosiloxanes such as polydimethylsiloxane having terminal triorganosiloxy groups wherein the organic substituents are, for example, methyl, vinyl or phenyl or combinations of these groups. Such polydimethylsiloxanes can for example have a viscosity of from about 5 to about 100,000 mPa·s at 25° C. When present, these can be in part A or in part B of the two part composition with the cross-linker and catalyst.

Alternatively compatible organic plasticisers may be utilised additionally to or instead of the silicone fluid plasticiser include dialkyl phthalates wherein the alkyl group may be linear and/or branched and contains from six to 20 carbon atoms such as dioctyl, dihexyl, dinonyl, didecyl, diallanyl and other phthalates, and analogous adipate, azelate, oleate and sebacate esters; polyols such as ethylene glycol and its derivatives; and organic phosphates such as tricresyl phosphate and/or triphenyl phosphates.

Examples of extenders for use in compositions herein include mineral oil based (typically petroleum based) paraffinic hydrocarbons, mixtures of paraffinic and naphthenic hydrocarbons, paraffin oils comprising cyclic paraffins and non-cyclic paraffins and hydrocarbon fluids containing naphthenics, polycyclic naphthenics and paraffins, or polyalkylbenzenes such as heavy alkylates (alkylated aromatic materials remaining after distillation of oil in a refinery). Examples of such extenders are discussed in GB2424898 the content of which is hereby enclosed by reference. Such a hydrocarbon extender can for example have an ASTM D 86-09 boiling point of from 235° C. to 400° C. An example of a preferred organic extender is the hydrocarbon fluid sold by Total under the trade mark Hydroseal® G250H. The extender or plasticiser may alternatively comprise one or more non-mineral based natural oil, i.e. an oil derived from animals, seeds or nuts and not from petroleum, or a derivative thereof such as a transesterified vegetable oil, a boiled natural oil, a blown natural oil, or a stand oil (thermally polymerized oil).

Other ingredients which may be included in the two part composition include but are not restricted to rheology modifiers; adhesion promoters, pigments, heat stabilizers, flame retardants, UV stabilizers, chain extenders, cure modifiers, electrically and/or heat conductive fillers, and fungicides and/or biocides and the like.

Rheology Modifiers

Rheology modifiers which may be incorporated in moisture curable compositions according to the invention include silicone organic co-polymers such as those described in EP 0802233 based on polyols of polyethers or polyesters; non-ionic surfactants selected from the group consisting of polyethylene glycol, polypropylene glycol, ethoxylated castor oil, oleic acid ethoxylate, alkylphenol ethoxylates, copolymers or ethylene oxide and propylene oxide, and silicone polyether copolymers; as well as silicone glycols. For some systems these rheology modifiers, particularly copolymers of ethylene oxide and propylene oxide, and silicone polyether copolymers, may enhance the adhesion of the sealant to substrates, particularly plastic substrates.

Adhesion Promoters

Examples of adhesion promoters which may be incorporated in moisture curable compositions according to the invention include alkoxysilanes such as aminoalkylalkoxysilanes, for example 3-aminopropyltriethoxysilane, epoxyalkylalkoxysilanes, for example, 3-glycidoxypropyltrimethoxysilane and, mercapto-alkylalkoxysilanes, and reaction products of ethylenediamine with silylacrylates. Isocyanurates containing silicon groups such as 1, 3, 5-tris (trialkoxysilylalkyl) isocyanurates may additionally be used. Further suitable adhesion promoters are reaction products of epoxyalkylalkoxysilanes such as 3-glycidoxypropyltrimethoxysilane with amino-substituted alkoxysilanes such as 3-aminopropyltrimethoxysilane and optionally with alkylalkoxysilanes such as methyltrimethoxysilane.

Chain Extenders

Chain extenders may include difunctional silanes which extend the length of the polysiloxane polymer chains before cross linking occurs or simultaneously with the cross-linking process. Chain extension reduces the modulus of elongation of the cured elastomer. Chain extenders and crosslinkers compete in their reactions with the functional polymer end groups; in order to achieve noticeable chain extension, the difunctional silane must have substantially higher reactivity than the trifunctional crosslinker with which it is used.

Suitable chain extenders include diamidosilanes such as dialkyldiacetamidosilanes or alkenylalkyldiacetamidosilanes, particularly methylvinyldi(N-methylacetamido)silane, or dimethyldi(N-methylacetamido)silane, diacetoxysilanes such as dialkyldiacetoxysilanes or alkylalkenyldiacetoxysilanes, diaminosilanes such as dialkyldiaminosilanes or alkylalkenyldiaminosilanes, dialkoxysilanes such as dimethoxydimethylsilane, diethoxydimethylsilane and α-aminoalkyldialkoxyalkylsilanes, polydialkylsiloxanes having a degree of polymerization of from 2 to 25 and having at least two acetamido or acetoxy or amino or alkoxy or amido or ketoximo substituents per molecule, and diketoximinosilanes such as dialkylkdiketoximinosilanes and alkylalkenyldiketoximinosilanes.

Pigments

Pigments are utilised to colour the composition as required. Any suitable pigment may be utilised providing it is compatible with the composition. In two part compositions pigments and/or coloured (non-white) fillers e.g. carbon black may be utilised typically in one part of the composition and may be relied upon to show good mixing of the different parts prior to application.

Biocides

Biocides may additionally be utilized in the composition if required. It is intended that the term "biocides" includes bactericides, fungicides and algicides, and the like. Suitable examples of useful biocides which may be utilised in compositions as described herein include, for the sake of example:

Carbamates such as methyl-N-benzimidazol-2-ylcarbamate (carbendazim) and other suitable carbamates, 10,10'-oxybisphenoxarsine, 2-(4-thiazolyl)-benzimidazole, N-(fluorodichloromethylthio)phthalimide, diiodomethyl p-tolyl sulfone, if appropriate in combination with a UV stabilizer, such as 2,6-di(tert-butyl)-p-cresol, 3-iodo-2-propinyl butylcarbamate (IPBC), zinc 2-pyridinethiol 1-oxide, triazolyl compounds andisothiazolinones, such as 4,5-dichloro-2-(n-octyl)-4-isothiazolin-3-one (DCOIT), 2-(n-octyl)-4-isothiazolin-3-one (OIT) and n-butyl-1,2-benzisothiazolin-3-one (BBIT). Other biocides might include for example Zinc Pyridinethione, 1-(4-Chlorophenyl)-4,4-dimethyl-3-(1,2,4-triazol-1-ylmethyl)pentan-3-ol and/or 1-[[2-(2,4-dichlorophenyl)-4-propyl-1,3-dioxolan-2-yl] methyl]-1H-1,2,4-triazole.

The fungicide and/or biocide may suitably be present in an amount of from 0 to 0.3% by weight of the composition and may be present in an encapsulated form where required such as described in EP2106418.

When mixed together the total composition of Part A and Part B comprises 30 to 70 weight % of polymer (e.g. amount of polymer (i)+Polymer (ii)+Polymer (iii)) containing reactive hydroxyl or hydrolysable groups bonded to silicon which groups are reactive in the presence of moisture;

0.5-10 weight % of crosslinker comprising at least three groups reactive with the silicon-bonded hydroxyl or hydrolysable groups of polymer;

15 to 35% weight % of reinforcing filler, 3 to 35 weight % of mineral microspheres With the total filler content being≤45% by volume of the composition, A suitable amount of tin based catalyst and suitable additives as hereinbefore described with the total composition being 100 weight %.

In the case of 2 part compositions there is provided a base composition, comprising in Part A:

10 to 70 weight % of polymer (i), 10 to 70 weight % of polymer (ii) and up to 10 weight % of polymer (iii),
15 to 35% weight % of reinforcing filler,
3 to 35 weight % of mineral microspheres; and suitable additives as hereinbefore described may also be present with the base composition total to 100 weight % of the base composition; and
in Part B
a cross-linking composition, comprising:
crosslinker comprising at least three groups reactive with the silanol groups in polymers (i), (ii) and (iii); and
catalyst.

Optionally the Crosslinking part may additionally comprise one or more polymers which are unreactive with Polymers (I), (i), (ii) and (iii) and crosslinker may be present. Typically the unreactive polymer functions as a plasticiser or extender as discussed above and is selected from polydimethylsiloxane having terminal triorganosiloxy groups wherein the organic substituents are, for example, methyl, vinyl or phenyl or combinations of these groups. Such polydimethylsiloxanes can for example have a viscosity of from about 5 to about 100,000 mPa·s at 25° C. Alternatively organic polymers such as mineral oil based (typically petroleum based) paraffinic hydrocarbons may be used, i.e. mixtures of paraffinic and naphthenic hydrocarbons, paraffin oils comprising cyclic paraffins and non-cyclic paraffins and hydrocarbon fluids containing naphthenics, polycyclic naphthenics and paraffins.

Furthermore, Part B may contain 0 to 50 weight % of filler depending on the mixing ratio of the two parts of the composition. Typically the ratio of the Part A composition: Part B composition is between 15:1 and 1:1, alternatively between 10:1 and 1:1. If the intended mixing ratio of the Part A composition:Part B composition is 15:1 or greater then no filler will be generally utilized in the cross-linking composition. However if the intended mixing ratio of the Part A composition:Part B composition is less than 15:1 an increasing amount filler will be utilized in the cross-linking composition up to the maximum of 50% if the intended ratio is 1:1. The moisture curable compositions can be prepared by mixing the ingredients employing any suitable mixing equipment.

In the case of 2 part sealant compositions, the components of each part are mixed together in amounts within the ranges given above and then the Part A composition and the Part B composition are inter-mixed in a predetermined ratio e.g. from 15:1 to 1:1, alternatively from 12:1 to 5:1.

Resulting compositions may be employed in a variety of applications, for example as coating, caulking, mold making and encapsulating materials. In particular they are for use as a low thermal conductivity sealant for structural glazing and/or insulating glazing and/or as an insulating glass sealant. Alternatively the composition may be used as a sealant in refrigerators or freezers.

There is also provided herein an insulating glass unit and/or building façade element e.g. a shadow box and/or structural glazing unit and/or a gas filled insulation construction panel which in each case is sealed with a secondary sealant cured from the silicone sealant composition as hereinbefore described.

Use of the sealant composition as described above as an insulating glass sealant e.g. for structural glazing, as a sealant in refrigerators or freezers and/or as a sealant in an oven and/or as a low thermal conductive coating on a substrate and/or as a structural coating on a substrate.

There is also provided a process of making an insulating glass unit comprising the following steps:
procuring two glass panes,
providing between the two glass panes a suitable spacer
Adhering the spacer to each pane of glass using a primary sealant, introducing into the cavity defined by the two panes and the spacer an inert or heavy gas and
applying a layer of the sealant composition as described above as a secondary sealant around the periphery of the unit in contact with external surfaces of the spacer.

There is also provided a façade element as hereinbefore described having a thermal conductivity of from 0.05 to below 0.2 W/mK.

The preceding compositions are henceforth illustrated by the following Examples, in which parts and percentages are by weight, unless otherwise indicated. Brookfield® cone plate viscometer (RV DIII) using cone plate CP-52 for viscosities of 40,000 mPa·s and below and cone plate CP-51 for materials having viscosities greater than 40,000 mPa·s adapting the speed according to the polymer viscosity. The present invention describes formulations, which can meet criteria for a structural sealant or adhesive, such as for example ETAG 002:2002 for structural glazing or EN 1279-4:2002 for insulating glass together with a thermal conductivity of the sealant below 0.2 W/mK. Moreover, these formulations are exhibiting an acceptable extrudability for standard two part equipment. Generally samples of the base composition or samples of the total composition (Part A+Part B) prior to cure were tested for their thermal conductivity in accordance with ISO 8301:1991 but similar results were obtain for post cured samples and in all instances the samples were determined to be below 0.2 W/mK.

EXAMPLES

In the following examples Polymers (i), (ii) and (iii) were each dimethylhydroxy silyl terminated polydimethylsiloxanes, differing in viscosity as depicted in the Tables below. The treated precipitated calcium carbonate used was Winnofil® SPM commercially available from Solvay. Three types of mineral microspheres were utilized. These were Sphericel® 34P30 from Potters Industries LLC of Valley Forge, Pa., Sphericel® 45P25 from Potters Industries LLC of Valley Forge, Pa. and 3M® XLD3000.

Mixing Procedure for Part A

The Polymers were weighed in a 750 ml plastic container and mixed together in a speedmixer for 30 seconds at 2350 rpm. Half of the quantity of the treated precipitated calcium carbonate was added and mixed in the speedmixer with the polymer mixture twice for 30 seconds at 2350 rpm. The second half of the treated precipitated calcium carbonate was is then added and the mixing in the speedmixer was repeated as before. Half of the quantity of the hollow glass beads was then added and mixed with the resulting mixture from the above in the speedmixer twice for 30 seconds at 2350 rpm. The second half of the hollow glass is then added and mixed in a speedmixer three times for 30 seconds at 2350 rpm. The resulting product was then mixed for 50 seconds under vacuum in the speedmixer at 2350 rpm followed by 15 seconds at atmospheric pressure in the speedmixer at 2350 rpm. The resulting Part A of the composition was poured a 170 ml sealant cartridge for storage prior to use.

Three different Part Bs were used to compare cured properties of examples:

Catalyst 1 is Dow Corning® 3362 HV catalyst, a tin based catalyst package commercially available from Dow Corning Corporation, Michigan, USA;
Catalyst 2 is Dow Corning® 994 catalyst a tin based catalyst package commercially available from Dow Corning Corporation, Michigan, USA; and
Catalyst 3 is a catalyst composed of:
- 47.0% wt of tetraethoxy silane,
- 29.9% wt of vinyl terminated polydimethyl siloxane (viscosity at 23° C. ca 50,000 mPa·s), 14.6% wt of carbon black,
- 6.7% wt of aminopropyl trimethoxysilane,
- 1.75% wt of Aerosil® 974 from Evonik AG,
- 0.1% of wt dimethyl tin dineodecanoate.

Mixing Procedure for Part A and Part B 180 g of Part A (prepared previously as described above) was weighed in a 500 ml container. 18 g of the appropriate Part B was then added and mixed in a speedmixer for twice at 20 seconds at 2350 rpm. Finally, the mixture is mixed in the speedmixer for 30 seconds at 2350 rpm and transferred into a 170 ml Semco® cartridge to facilitate application.

Test pieces e.g. H-shaped pieces for tensile testing were provided by placing a suitable shaped mold on the non-tin side of a piece of float glass and introducing a predetermined amount of the above into a mold The resulting test pieces were allowed to cure for one day and then were demolded from the glass surface and the mold. The samples were then allowed to cure for a further 27 days. Tensile testing was performed. Hence, the cured properties were measured after 28 days of cure at 23° C. 50% relative humidity.

Thermal Conductivity Measurement

A sample of the Part A composition was applied between two polyethylene sheets in a quantity sufficient to make a test piece having a circular cross-section of 150 (+/−1) mm diameter and 18 (+/−1) mm thickness. The material applied was squeezed gently using the two plates to the thickness of 18 mm using Nordson® Tapes 18 mm thick spacers at each corner of the plates.

The test piece was then introduced into a Heat Flow Meter Lasercomp® Fox 314 to perform thermal conductivity measurements according to ISO 8301: 1991. A temperature of 0° C. on the upper plate and 20° C. at the lower plate was set until an equilibrium state is achieved. The thickness (s) of the sample was averaged from the 4 corners automatically by the equipment. The heat flow (q) at the upper and lower plate must be equal and is used in the following equation to measure the thermal conductivity ($\lambda$) of the sample.

$$\lambda = (q \cdot s)/(A \cdot \Delta T).$$

in which
s = the average thickness of the panel
A = is the surface area of the panel, and
$\Delta T$ = temperature change (° C.)
The error of measurement was estimated to about 4%.

Extrusion Rate Measurement

Extrudability was determined at 23° C. by measuring the rate of a part A sample that will extrude through a calibrated hole of 5.5 mm in diameter when applying a pressure of 6.22 bar ($6.22 \times 10^5$ N/m$^2$) on the plunger of a 310 ml Semco® sealant cartridge. The results are reported in grams per minute.

Slump Measurement (10 Minutes) Part A

The slump behaviour of a sample of part A composition was determined by applying a test having a circular cross-section of 50 mm diameter and a thickness of 10 mm on a stainless steel substrate at 23° C. The substrate was moved into a vertical position and the distance by which the sample of part A composition moved under gravity forces after 10 minutes was recorded Tensile Properties Tensile properties were measured according to ISO 8339: 2005 standard. The tensile properties of the previously prepared H-pieces were measured on a Zwick tensiometer at a speed of 5.5 mm/min until rupture. The results provided in Table 1 and 2 are an average of three tested samples.

In Table 1 and 2 the ingredients are listed in parts and therefore are not required to add up to 100. For this case the amount present of each ingredient might be measured in grams, e.g. for example 1 of e.g. 50 g polymer (i) and 3 grams polymer (iii) etc.

Total Filler Content (Solid Content) The total filler content by volume is determined by calculation based on the density of each ingredient (which was either provided by the supplier or determined in the laboratory) and then values of volume were extrapolated from the results, given the weight was known.

TABLE 1

| | Ex 1 | Ex 2 | Ex 3 | Ex 4 | Ex 5 | Ex 6 | Ex 7 | Ex 8 | Ex 9 |
|---|---|---|---|---|---|---|---|---|---|
| Part A formulation | | | | | | | | | |
| Polymer (i) 50,000 mPa · s | 50 | 50 | 50 | 50 | 50 | 50 | 50 | 20 | 80 |
| Polymer (ii) 12,500 mPa · s | 50 | 50 | 50 | 50 | 50 | 50 | 50 | 80 | 20 |
| Polymer (iii) 41 mPa · s | 3 | 3 | 3 | 3 | 3 | 3 | 3 | 3 | 3 |
| Precipitated calcium carbonate | 37 | 37 | 29 | 44 | 41 | 37 | 37 | 37 | 37 |
| Sphericel ® 34P30 glass beads | 19 | 19 | | | 22 | 15 | 19 | 19 | 19 |
| Sphericel ® 45P25 glass beads | | | 27 | | | | | | |
| XLD3000 glass beads | | | | 12 | | | | | |
| Part B & (weight ratio Part A:Part B) | | | | | | | | | |
| Part B 1 | 10:1 | | 10:1 | 10:1 | 10:1 | 10:1 | | 10:1 | 10:1 |
| Part B 2 | | 10:1 | | | | | | | |
| Part B 3 | | | | | | | 10:1 | | |
| Physical properties of base | | | | | | | | | |
| Thermal Conductivity (W/mK) | 0.18 | 0.18 | 0.17 | 0.18 | 0.18 | 0.18 | 0.18 | 0.18 | 0.18 |
| Extrusion rate (g/min) | 71 | 76 | 67 | 56 | 59 | 98 | 76 | 99 | 52 |

TABLE 1-continued

|  | Ex 1 | Ex 2 | Ex 3 | Ex 4 | Ex 5 | Ex 6 | Ex 7 | Ex 8 | Ex 9 |
|---|---|---|---|---|---|---|---|---|---|
| Slump (mm) | 25 | 24 | 48 | 7 | 8 | 48 | 24 | 24 | 16 |
| Solid content (volume %) | 38 | 38 | 38 | 38 | 41 | 34 | 38 | 38 | 38 |
| Physical properties of the cured product | | | | | | | | | |
| Cohesive failure (%) | 100 | 99 | 75 | 90 | 97 | 100 | 98 | 97 | 96 |
| Tensile strength (MPa) | 1.16 | 1.03 | 0.99 | 1.04 | 1.13 | 1.05 | 1.15 | 1.10 | 1.10 |
| Elongation at break (%) | 59 | 53 | 43 | 45 | 49 | 63 | 69 | 48 | 59 |

TABLE 2

|  | CEx1 | CEx2 | CEx3 | CEx4 | CEx5 | CEx6 |
|---|---|---|---|---|---|---|
| Part A formulation | | | | | | |
| Polymer (i) 50,000 mP·s | 100 | | 50 | 50 | 50 | 50 |
| Polymer (ii) 12,500 mPa·s | | 100 | 50 | 50 | 50 | 50 |
| Polymer (iii) 41 mPa·s | 3 | 3 | | 3 | 3 | 3 |
| Precipitated calcium carbonate | 37 | 37 | 37 | 37 | 37 | 50 |
| Sphericel ® 34P30 glass beads | 19 | 19 | 19 | 25 | 30 | 19 |
| Part B (weight ratio Part A:Part B) | | | | | | |
| Part B 1 | 10:1 | 10:1 | 10:1 | 10:1 | 10:1 | 10:1 |
| Physical properties of base | | | | | | |
| Thermal Conductivity (W/mK) | 0.18 | 0.17 | 0.18 | 0.17 | 0.16 | 0.19 |
| Extrusion rate (g/min) | 44 | 113 | 63 | 49 | 30 | 63 |
| Slump (mm) | 21 | >100 | >100 | 11 | 5 | 4 |
| Solid content (volume %) | 38 | 38 | 39 | 43 | 47 | 40 |
| Physical properties of the cured product | | | | | | |
| Cohesive failure (%) | 99 | 96 | 98 | 92 | 67 | 100 |
| Tensile strength (MPa) | 1.03 | 1.05 | 1.06 | 1.13 | 1.22 | 1.28 |
| Elongation at break (%) | 60 | 46 | 48 | 46 | 39 | 56 |

Comparing all examples with comparative examples 1 it can be seen that replacing 50% of polymer (i) with Polymer (ii) (exhibiting a viscosity significantly below 50,000 mPa·s at 25° C.), helps achieving an extrusion rate above 50 g/min.

Comparing all examples with comparative example 2 it can be seen that incorporating a polymer exhibiting a viscosity around 50,000 mPa·s at 25° C. helps provide a Part A formulation, which exhibits a limited slump. Having a Part A composition which exhibits high slump values will generally negatively affect the slump properties of the product resulting from mixing Part A and Part B.

Comparing example 1 with comparative example 2 it can be seen that incorporating polymer (i) exhibiting a viscosity around 50,000 mPa·s at 25° C. helps improve elongation at break.

Comparing all examples with comparative example 3 it can be seen that incorporating optional Polymer (iii) having a very low viscosity 41 mPa·s at 25° C. helps to achieve a Part A formulation, which exhibits a limited slump.

Comparing example 1 with comparative example 5 it can be seen that increasing the solid content above 45 vol % (i.e. total filler content) results in reduced values for elongation at break.

Comparing example 1 with comparative example 6 it can be seen that the addition of a high content of calcium carbonate is impairing thermal conductivity of the base.

There are now provided a series of thermal simulations on high performance façade systems are showing that an insulating glass (IG) secondary sealant exhibiting a thermal conductivity below 0.2 W/mK according to EN 12667 could have a favourable impact on heat transfer coefficient(s) of a façade (often referred to as the U value).

Thermal Simulations

Thermal modelling was undertaken following the EN ISO 10077-2. standard method, using THERM 6.3 program for modelling complex glazing systems available from Lawrence Berkeley National Laboratory, USA.

The modelling was undertaken for a standard window/glazing size of 1.23 m×1.48 m and a standard size vision area of curtain wall of 1.5 m×3.0 m.

Three types of frames were modelled:
a silicone structural glazed system (SSG),
a captured system (CS, mechanical fixation) and
a toggle system (TS).

The three frames are based on state of the art frames available in Europe. The modelling of the toggle frame was done according to the procedure of EN ISO 10077-2 and the following assumptions were made concerning the amount of toggles per linear meter. For these results, we used 4 toggles per linear meter at an average toggle diameter of 13 mm, i.e. 4×13 mm=52 mm per linear meter of toggle. The remaining is frame without channel and without toggle.

The use of a low thermal conductivity sealant for the secondary sealant of an IGU becomes interesting in optimized curtain wall systems, i.e. whereby a triple IGU is used, built up with a high efficiency (warm edge WE) spacer. Weatherseal or structural joints have been modelled with silicones at a standard thermal conductivity of 0.35 W/mK. as prescribed in the aforementioned THERM 6.3 program.

A state of the art triple IGU with the following build-up was chosen:
6 mm low-e coated glass,
a 14 mm argon filled cavity,
an inner pane of 4 mm glass,
a second cavity of 14 mm filled with argon and finally
a 6 mm internal glass.

This type of build-up reaches a center of glass U-value (heat transfer coefficient) of 0.7 W/m²K. This IGU was used for the SG and the mechanical fixed frame For the toggle frame, the build-up was slightly different and consisted of 6 mm low e-12 mm argon filled cavity-4 mm glass-20 mm argon filled cavity-8 mm glass but with the same $U_g$— (i.e. the U value for the center of glass)=0.7 W/m²K.

For the modelling a warm edge spacer was used with linear thermal conductivity at 0.14 W/mK. Similar results can be expected when using different types of warm edge spacers.

For the secondary sealant of the IGU, 3 different thermal conductivities were modelled for each frame:—.

The benchmark is a thermal conductivity of 0.35 W/mK. This corresponds with the value advised by EN ISO 10077 for silicone and was used for the weatherseal joint and/or structural glazing joint The second thermal conductivity value was 0.28 W/mK. This is representative for a Polyurethane (PU) sealant, and finally, a sealant with a thermal conductivity value of 0.19 W/mK was used. This corresponds to a material, which can be manufactured using the current invention described in this disclosure.

The joint dimension for the secondary sealant was set at 6 mm which is frequently used as the joint dimension. The joint dimension in the IGU for the toggle system is slightly different, 6 mm depth for the first cavity and 12 mm depth, 6 mm thickness for the joints in the second cavity including the toggle.

Ucw values were calculated for different frame systems and different thermal conductivities for a wall consisting of framed glazed units of 1.23 m by 1.48 m.

The results can be found in Table 3 below. The U values for the curtain wall (Ucw) were rounded in accordance to EN ISO 10077-1.

TABLE 3

| Frame | Ucw (W/m²K) value when thermal conductivity = 0.19 W/mK | Ucw value (W/m²K) when thermal conductivity = 0.28 W/mK | Ucw value (W/m²K) when thermal conductivity = 0.35 W/mK |
|---|---|---|---|
| silicone structural glazed system (SSG) | 1.0 | 1.1 | 1.1 |
| captured system (CS) | 0.99 | 1.0 | 1.0 |
| Toggle System (TS) | 1.0 | 1.1 | 1.1 |

The results show that changing the thermal conductivity of the secondary sealant has a significant impact on the resulting $U_{cw}$ for the curtain wall and the benefit can be gained by merely replacing a previous secondary sealant with the sealant composition as provided herein. A difference of up to 0.1 W/m²K is observed once the rounding to 1 significant digit for Ucw>1 W/m²K and to 2 significant digits for Ucw<1 W/m²K is done. This kind of improvement cannot be obtained with secondary sealants having a thermal conductivity superior or equal to 0.2 W/mK.

Similarly, the results for curtain walls using a larger IGU of 1.5 m by 3.0 m was be studied as depicted in Table 4.

TABLE 4

Ucw values as calculated for different frame systems and different thermal conductivities (units of 1.5 m × 3.0 m)

| frame | Ucw (W/m²K) value when thermal conductivity = 0.19 W/mK | Ucw (W/m²K) value when thermal conductivity = 0.28 W/mK | Ucw (W/m²K) value when thermal conductivity = 0.35 W/mK |
|---|---|---|---|
| SSG | 0.93 | 0.95 | 0.96 |
| CS | 0.90 | 0.91 | 0.92 |
| TS | 0.94 | 0.95 | 0.96 |

The benefit of the secondary sealant as hereinbefore described is less pronounced in this case since there is relatively more highly efficient glazed surface than edge in the IGU.

The invention claimed is:

1. A two part moisture curing composition, said composition comprising: a part A); and a part B);
   wherein part A) comprises
      a polymer mixture of polymer (i) and polymer (ii), where polymer (i) is a siloxane polymer having at least two terminal hydroxyl or hydrolysable groups and a viscosity≥25,000 m·Pas at 25° C., and where polymer (ii) is a siloxane polymer having at least two terminal hydroxyl or hydrolysable groups and a viscosity of between 1,000 and 20,000 m·Pas at 25° C.; wherein part A) further comprises a reinforcing filler and a low-density filler;
   wherein the total filler content is between 30 and 45% in volume of the total composition;
   wherein part B) comprises a moisture curing agent formulation comprising;
      a tin based catalyst, and
      one or more crosslinkers having three or more hydroxyl and/or hydrolysable groups for curing part A); and
   wherein part A) and/or the composition of part A)+part B) after mixing has a thermal conductivity≤0.20 W/m·K according to ISO 8301.

2. The two part moisture curing composition in accordance with claim 1, wherein polymer (i) is present in the composition in an amount of from 10 to 70% by weight based on the total weight of part A).

3. The two part moisture curing composition in accordance with claim 1, wherein polymer (ii) is present in the composition in an amount of from 10 to 70% by weight based on the total weight of part A).

4. The two part moisture curing composition in accordance with claim 1, wherein the reinforcing filler is selected from the group consisting of fumed silicas, precipitated silicas and/or precipitated or ground calcium carbonates, and is present in the composition in an amount of from 15 and 35% by weight of the total composition.

5. The two part moisture curing composition in accordance with claim 4, wherein the reinforcing filler comprises precipitated calcium carbonate.

6. The two part moisture curing composition in accordance with claim 1, wherein the low-density filler comprises mineral hollow microspheres having a particle density of between 0.15 to 0.5 g/cm³, and is present in the composition in an amount of from 3 to 35% by weight of the total composition.

7. The two part moisture curing composition in accordance with claim 6, wherein the low-density filler comprises hollow glass beads.

8. The two part moisture curing composition in accordance with claim 1, wherein the viscosity of the polymer mixture is between 20,000 and 40,000 mPa·s at 25° C.

9. The two part moisture curing composition in accordance with claim 1, further comprising polymer (iii), a siloxane polymer having terminal hydroxyl or hydrolysable groups and a viscosity of between 10 and 500 mPa·s at 25° C.

10. The two part moisture curing composition in accordance with claim 9, wherein polymer (iii) is present in an amount of from 0.5 to 10% by weight based on the total weight of part A).

11. The two part moisture curing composition in accordance with claim 1, wherein part A) comprises:
   10 to 70 weight % of polymer (i);
   10 to 70 weight % of polymer (ii);
   up to 10 weight % of polymer (iii), a siloxane polymer having terminal hydroxyl or hydrolysable groups and a viscosity of between 10 and 500 mPa·s at 25° C.;
   15 to 35 weight % of the reinforcing filler; and
   3 to 35 weight % of the low-density filler, optionally hollow mineral microspheres; and
   optionally, one or more additives;
   with the total being 100 weight % of the part A) composition.

12. The two part moisture curing composition in accordance with claim 1, wherein the ratio of part A):part B) in the composition is between 15:1 and 1:1.

13. A one part moisture curing composition, said composition comprising a mixture of part A) and part B) in accordance with claim 1.

14. The one part moisture curing composition in accordance with claim 13, comprising:
   30 to 70 weight % of the polymer mixture (II) containing reactive hydroxyl or hydrolysable groups bonded to silicon, which groups are reactive in the presence of moisture;
   0.5 to 10 weight % of a crosslinker comprising at least three groups reactive with the silicon-bonded hydroxyl or hydrolysable groups of the polymer mixture;
   15 to 35 weight % of the reinforcing filler;
   3 to 35 weight % of the low-density filler, optionally hollow mineral microspheres;
   with the total filler content being ≤45% by volume of the composition; and
   tin based catalyst; and
   optionally, one or more additives;
   with the total composition being 100 weight %.

15. The two part moisture curing composition in accordance with claim 14, wherein the polymer mixture (II) further comprises polymer (iii), a siloxane polymer having terminal hydroxyl or hydrolysable groups and a viscosity of between 10 and 500 mPa·s at 25° C.

16. A coating, sealing, caulking, mold making, or encapsulating material, said material comprising or formed from the two part moisture curing composition in accordance with claim 1.

17. An insulating glass sealant, a sealant in refrigerators or freezers, a sealant in an oven and/or a low thermally conductive coating on a substrate and/or a structural coating on a substrate comprising or formed from the two part moisture curing composition in accordance with claim 1.

18. An insulating glass unit and/or a building façade element and/or a structural glazing unit and/or a gas filled insulation construction panel which in each case is sealed with a secondary sealant cured from a silicone sealant composition, wherein the sealant composition comprises or is formed from the two part moisture curing composition in accordance with claim 1.

19. A process of making an insulating glass unit, said process comprising:
   procuring two glass panes;
     providing a spacer between the two glass panes;
   adhering the spacer to each pane of glass using a primary sealant;
     introducing into a cavity defined by the two glass panes and the spacer an inert or heavy gas; and
     applying a layer of a sealant composition as a secondary sealant around the periphery of the insulating glass unit in contact with external surfaces of the spacer;
   wherein the sealant composition comprises or is formed from the two part moisture curing composition in accordance with claim 1.

* * * * *